May 1, 1951 B. T. WAGERS 2,551,478
SUPERCHARGED TWO-CYCLE ENGINE WITH RETARDED FIRING
Filed Sept. 22, 1948 3 Sheets-Sheet 1
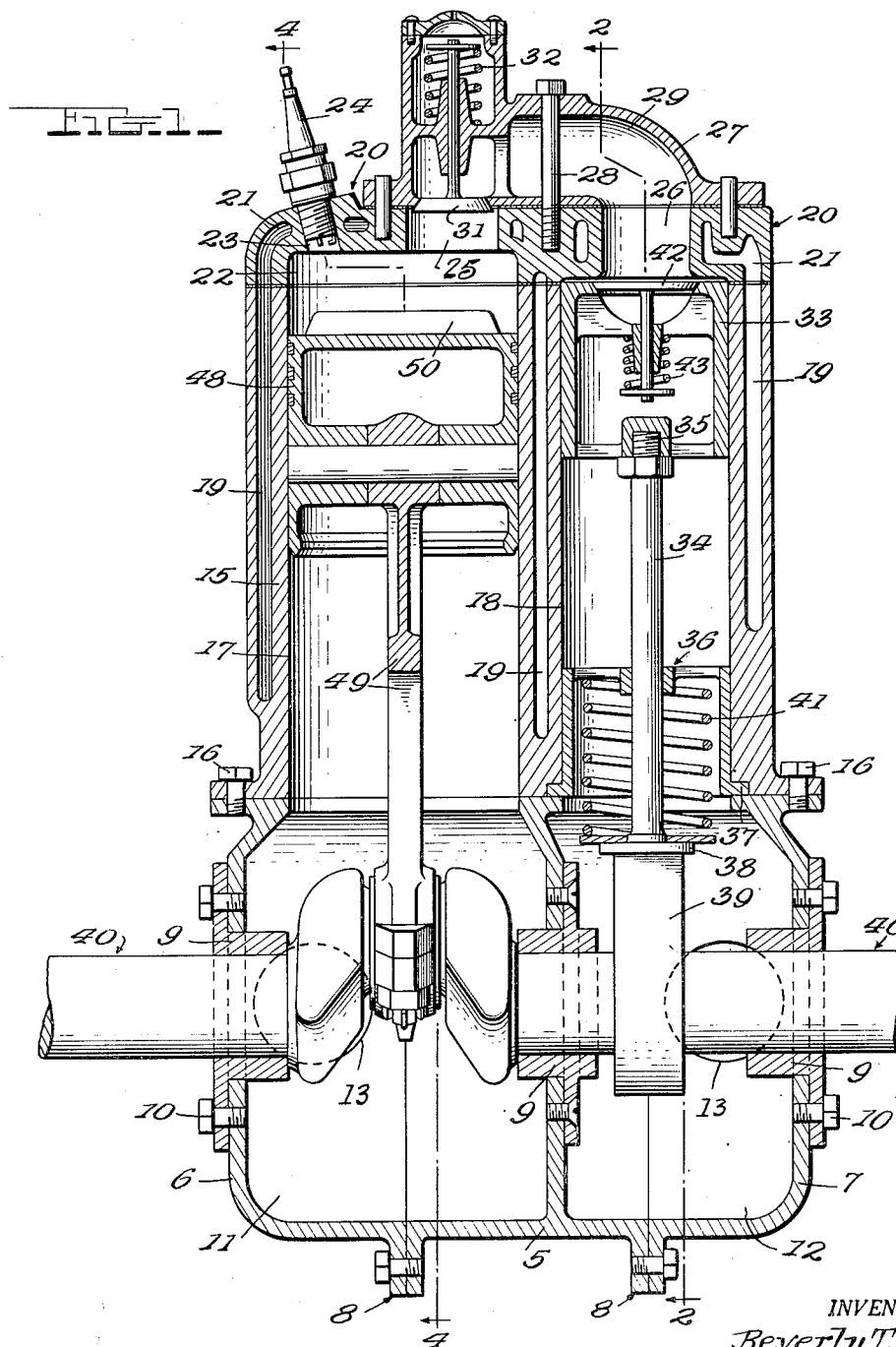
INVENTOR.
Beverly T. Wagers.
BY
Mason, Porter, Diller & Stewart
ATTORNEYS

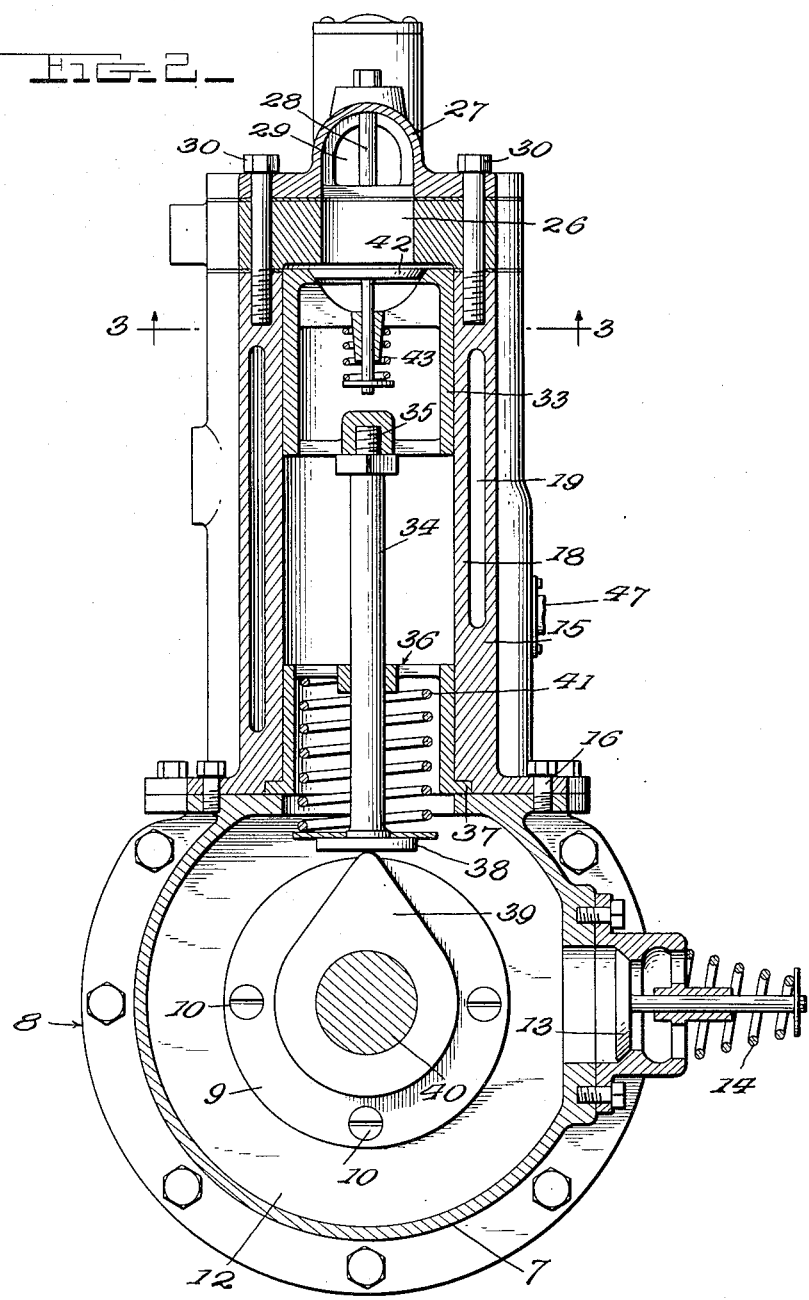

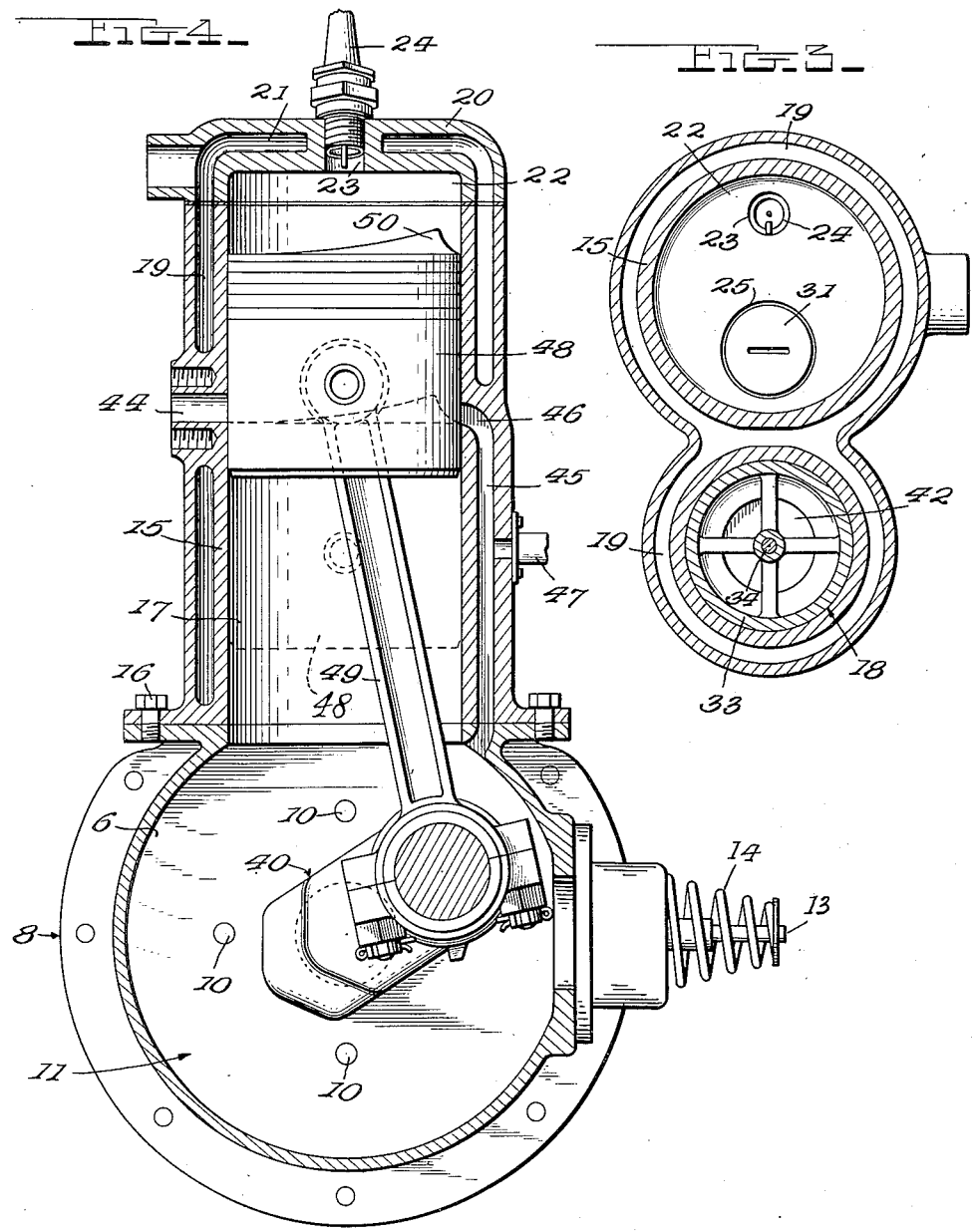

Patented May 1, 1951

2,551,478

UNITED STATES PATENT OFFICE 2,551,478

SUPERCHARGED TWO-CYCLE ENGINE WITH RETARDED FIRING

Beverly T. Wagers, Irvine, Ky., assignor of one-fourth to J. M. Wolfinbarger, Irvine, one-fourth to Charles W. Ball, Bybee, one-eighth to R. E. Lancaster, Lexington, one-eighth to Cleo Lancaster, Covington, and one-eighth to Eli Sparks, Leighton, Ky.

Application September 22, 1948, Serial No. 50,471

10 Claims. (Cl. 123—70)

The invention relates generally to internal combustion engines and primarily seeks to provide a novel form of engine of the two-cycle type in which provision is made for retarding the firing in a given cylinder until the piston has advanced a considerable distance beyond top dead center, and also for supercharging said cylinder in an amount over and beyond that necessary to compensate for the compression loss due to said movement of the piston beyond dead center prior to the initiation of combustion.

It is well known that in internal combustion engines the usual firing of the cylinders when the pistons therein are substantially at top dead center imposes great strain upon the cylinder, piston, pitman, crank shaft and bearing structures and contributes in a large measure toward loss of efficiency in operation in, and longevity of, such engines. While it has been known that these problems could, in a measure, be solved by retarding the firing in the cylinders to occur after the pistons had advanced a considerable distance beyond top dead center, efforts to solve the problems stated by merely retarding the firing in the cylinders resulted in the initiation of combustion without proper compression and consequent inefficiency in operation. It is the purpose of the present invention to provide a novel engine structure in which the firing in each cylinder can be retarded in the manner desired, and in which means is provided for supercharging the cylinder just prior to firing, and in an amount over and beyond that necessary to compensate for the compression loss incidental to the movement of the piston beyond top dead center prior to the initiation of combustion.

In its more detailed nature the invention resides in the provision in an internal combustion engine of a main piston, cylinder and crank shaft arrangement and a firing means adapted to initiate combustion after the piston has moved a considerable distance beyond top dead center, a novel piston and cylinder and by-pass arrangement also being included which is effective to force air into the main cylinder as the piston therein is moving beyond top dead center in order not only to compensate for compression loss due to said piston movement past dead center but also to supercharge said main cylinder just prior to initiation of combustion therein.

Another object of the invention is to provide an engine structure of the character stated which operates on the two-cycle principle wherein the main piston uncovers exhaust and inlet porting at the bottom of its stroke, and wherein air compressed in the crank case is directed into the main cylinder through said inlet porting.

Another object of the invention is to provide in an engine of the character stated an auxiliary crank case portion into which air is drawn and partially compressed by an auxiliary cylinder and piston means which also serves as the means for forcing the partially compressed air into the main cylinder and therein additionally compressing the same as a supercharge.

Another object of the invention is to provide an engine structure of the character stated in which the main air charge is directed into the main cylinder from the main crank case and through a duct leading to the intake porting, means also being provided for injecting fuel charges into said duct.

With the above and other objects in view that will hereinafter appear, the nature of the invention will be more clearly understood by reference to the following detailed description, the appended claims, and the several views illustrated in the accompanying drawings.

In the drawings:

Figure 1 is a vertical longitudinal section illustrating an engine embodying the invention, the main piston and the auxiliary or supercharger piston being shown in the position at which firing occurs.

Figure 2 is a vertical cross section taken on the line 2—2 on Figure 1.

Figure 3 is a horizontal section taken on the line 3—3 on Figure 2.

Figure 4 is a vertical cross section taken on the line 4—4 on Figure 1, the fuel charge admitting and burnt charge scavenging position of the main piston being shown in dotted lines.

In the example of embodiment of the invention herein disclosed the improved engine structure is illustrated as including a crank case which may be composed of a central section 5, an end section 6, and a second end section 7, said sections being flange assembled as at 8. The crank case thus formed is equipped with axially aligned openings in which bearing members 9 are secured as at 10.

The center and end sections at one end of the crank case cooperate to form a main air chamber 11, and the center and end section at the other end of the crank case cooperate to form an auxiliary air chamber 12. Each said chamber may be equipped with an intake valve 13 of the poppet type, normally held seated by spring means 14, or one only of said chambers may be so equipped, provision being made for intercommunication between said chambers.

The main cylinder block 15 is secured as at 16 upon the crank case structure and is formed to provide a main cylinder 17 and an auxiliary cylinder 18, both said cylinders being surrounded by suitable water jacketing 19. A cylinder head 20 is mounted on the main cylinder block 15 and is also water jacketed as at 21. The cylinder head has a main cylinder extension or head portion 22 through which a plug opening 23 is provided to serve as a mounting for the ignition plug 24. Said head also is equipped with an intake port 25 opening downwardly into the head portion 22 in the manner clearly illustrated in Figure 1, and a delivery port 26 which is centered over the auxiliary cylinder 18. A by-pass head 27 is removably secured as at 28 on the cylinder head 20, and provides a passage 29 extending from the delivery port 26 into position over the intake port 25. The heads 27 and 20 are together secured on top of the main cylinder block 15, as by the cap screws 30 as illustrated in Figure 2.

A poppet valve 31 is mounted in the by-pass head 27 in position for controlling the entrance into the intake port 25, said valve being normally spring seated by the spring means generally designated 32 to close the top of the compression valve within the upper end of the main cylinder 17 and the extension or head portion 22.

A supercharger piston 33 is reciprocably mounted in the auxiliary cylinder 18 and has a pitman 34 rigidly secured thereto as at 35. The pitman passes downwardly through a guide 36 secured as at 37 at the lower end of the auxiliary cylinder 18, and has an abutment 38 at its lower end extremity. The abutment 38 engages a cam 39 secured to a crank shaft 40 which is rotatably mounted in the crank case in the bearings 9, and a spring means interposed between the guide 36 and the abutment 38 serves to yieldably maintain the contact of the pitman with the control cam which serves to lift and lower the supercharger piston 33 as the crank shaft is rotated. A valve 42 is mounted in the upper end of the supercharger piston 33 and is yieldably held in depressed position in which it closes the top of said piston by the spring means 43.

An exhaust port 44 opens through one side wall of the main cylinder 17, and a by-pass 45 communicates between the interior of the main air chamber 11 in the crank case and an intake port 46 disposed opposite the exhaust port in the main cylinder wall. During the operation of the engine fuel from a fuel ejector 47 is injected into air passing upwardly from the crank case chamber 11 through the by-pass 45 and the intake port 46 into the main cylinder 17 whenever the main piston 48 connected with the crank shaft 40 by the pitman 49 is lowered to a point at which the exhaust and intake ports 44 and 46 are uncovered. At this time the deflector 50 on said main piston diverts the in-running fuel charge upwardly in the main cylinder so that it will aid in the scavenging of burnt gases through the exhaust port 44 in the usual manner.

In this disclosure of the improved engine structure a single working piston and cylinder unit is disclosed, but it is to understood that a greater number of cylinder and piston equipments may be employed and connected with a crank shaft having the cranks and the cams 39 thereon spaced about the circle in suitable manner for properly directing to the crank shaft the explosive force incidental to the properly timed firing of the several cylinders.

It is to be understood that the operation of the ignition plug 24 is so timed by means not shown as to fire the cylinder after the main piston 48 has passed top dead-center a considerable distance, or more specifically, after the crank has passed top dead-center a distance of 57½°. The main and auxiliary pistons 48 and 33 are illustrated in Figure 1 in the position at which the combustion in the main cylinder is initiated. When combustion occurs, each piston begins its effective downward stroke. The main piston 48 is forced downwardly by the expanding gases until it has uncovered the exhaust porting 44 and the intake porting 46. The burnt gases escape through the exhaust porting 44 and simultaneously, a fresh charge of fuel mixture comprising air drawn into the crank case chamber 11 during the preceding up stroke of the piston 48 and compressed by downward movement of the said piston within the space below said piston and in the chamber 11, and fuel injected into said compressed air as it is being forced upwardly through the by-pass duct 45 is directed through said by-pass and through the intake porting 46 into the main cylinder where it is deflected upwardly by the deflector portion 50 of the main piston to assist in the scavenging of the cylinder in the manner previously referred to.

As the main piston moves upwardly it closes the exhaust porting 44 and the intake porting 46 and compresses the fuel mixture between the upper surface of the main piston and the cylinder head 20 beneath the poppet valve 31. The supercharger piston 33 moves upwardly and downwardly in timed relation with the main piston and will be still rising at the time the main piston reaches the upper limit of its stroke, attaining its maximum outer stroke limit illustrated in Figure 1 only after the main piston has reached and receded from its outer stroke limit, or in other words until the crank has passed 57½° beyond top dead center. During each outward movement of the pistons 48 and 33 air is drawn into the crank case through the poppet valve equipments 13, and during the downward movement of the supercharger piston 33 air in the cylinder beneath said piston and within the crank case chamber 12 is partially compressed, finally forcing open the spring seated poppet valve 42 in the supercharger piston and passing into the space above said supercharger piston.

As the supercharger piston 33 approaches the outer limit of its stroke, and as the main piston 48 is receding from the outer limit of its stroke, said supercharger piston compresses the air in the upper portion of the auxiliary cylinder 18 and in the by-pass 29, forcing open the poppet valve 31 and supercharging the main cylinder above the main piston 48. The volumetric displacement of the supercharger piston 33 and the size of the passages communicating between the auxiliary cylinder 18 and the upper portion of the main cylinder 17 are so controlled that the pumping action of the supercharger piston will deliver into the main cylinder an amount of air in excess of that necessary to compensate for compression loss due to the movement of the crank past dead-center prior to ignition of the compressed charge. It is preferred that this amount of auxiliary compression shall be approximately 15% greater than that necessary to compensate or the reduction in compression in the main cylinder which would otherwise result from the lowering of the main piston prior to firing, and thus a supercharging of the main cylinder is provided for just prior to the ignition of the fuel charge.

While one form of the invention has been shown for purposes of illustration, it is to be clearly understood that various changes in the details of construction and arrangement of parts may be made without departing from the spirit and scope of the invention as defined in the appended claims.

I claim:

1. In an internal combustion engine, a cylinder, a piston reciprocable in said cylinder, a rotary crank shaft, a pitman connecting the piston and crank shaft, means for directing a fuel charge into the cylinder, an igniter adapted to initiate combustion in the cylinder after the crank shaft and piston have travelled a considerable distance beyond top dead center, and means effective just prior to the initiation of combustion to initiate and complete a supercharging of said cylinder.

2. In an internal combustion engine, a cylinder, a piston reciprocable in said cylinder, a rotary crank shaft, a pitman connection the piston and crank shaft, means for directing a fuel charge into the cylinder, an igniter adapted to initiate combustion in the cylinder after the crank shaft and piston have travelled a considerable distance beyond top dead center, and means effective just prior to the initiation of combustion to initiate and complete a forcing of air into the cylinder in an amount greater than that necessary to compensate for the loss of compression incidental to the movement of the piston beyond top dead center prior to said initiation of combustion.

3. In an internal combustion engine, a cylinder, a piston reciprocable in said cylinder, a rotary crank shaft, a pitman connecting the piston and crank shaft, means for directing a fuel charge into the cylinder, an igniter adapted to initiate combustion in the cylinder after the crank shaft and piston have travelled a distance of approximately fifty-seven degrees beyond top dead center, and means effective just prior to the initiation of combustion to initiate and complete a supercharging of said cylinder.

4. In an internal combustion engine, a cylinder, a piston reciprocable in said cylinder, a rotary crank shaft, a pitman connecting the piston and crank shaft, means for directing a fuel charge into the cylinder, an igniter adapted to initiate combustion in the cylinder after the crank shaft and piston have travelled a distance of approximately fifty-seven degrees beyond top dead center, and means effective just prior to the initiation of combustion to initiate and complete a forcing of air into the cylinder in an amount greater than that necessary to compensate for the loss of compression incidental to the movement of the piston beyond top dead center prior to said initiation of combustion.

5. In an internal combustion engine, a cylinder, a piston reciprocable in said cylinder, a rotary crank shaft, a pitman connecting the piston and crank shaft, means for directing a fuel charge into the cylinder, an igniter adapted to initiate combustion in the cylinder after the crank shaft and piston have travelled a distance of approximately fifty-seven degrees beyond top dead center, and auxiliary piston and cylinder means for directing air into and compressing the same in the first mentioned cylinder as the piston therein is moving beyond top dead center to initiate and complete a supercharging of the same prior to the initiation of combustion.

6. In an internal combustion engine, a cylinder, a piston reciprocable in said cylinder, rotary crank shaft, a pitman connecting the piston and crank shaft, means for directing a fuel charge into the cylinder, an igniter adapted to initiate combustion in the cylinder after the crank shaft and piston have travelled a considerable distance beyond top dead center, means effective just prior to the initiation of combustion to initiate and complete a supercharging of said cylinder, said cylinder having exhaust porting therein uncovered by the piston near the lower end of its stroke and inlet porting similarly uncovered by said piston and forming a part of said fuel charge directing means.

7. In an internal combustion engine, a cylinder, a piston reciprocable in said cylinder, a crank case, a crank shaft rotatable in said crank case and connected through a pitman with said piston, said cylinder having exhaust porting therein uncovered by the piston near the lower end of its stroke and inlet porting similarly uncovered by said piston, a duct connecting the crank case with said inlet porting, means for admitting air into said crank case as the piston moves upwardly toward top dead center to be partially compressed therein as said piston moves downwardly toward bottom dead center and discharged upwardly through said duct as the piston uncovers said inlet porting, means for introducing fuel into the duct to form a fuel mixture with the air being discharged upwardly through said duct an igniter adapted to initiate combustion in the cylinder after the piston has travelled a considerable distance beyond top dead center, and means effective just prior to the initiation of combustion to supercharge said cylinder.

8. In an internal combustion engine, a cylinder, a piston reciprocable in said cylinder, a crank case, a crank shaft rotatable in said crank case and connected through a pitman with said piston, said cylinder having exhaust porting therein uncovered by the piston near the lower end of its stroke and inlet porting similarly uncovered by said piston, a duct connecting the crank case with said inlet porting, means for admitting air into said crank case as the piston moves upwardly toward top dead center to be partially compressed therein as said piston moves downwardly toward bottom dead center and discharged upwardly through said duct as the piston uncovers said inlet porting, means for introducing fuel into the duct to form a fuel mixture with the air being discharged upwardly through said duct an igniter adapted to initiate combustion in the cylinder after the piston has travelled a considerable distance beyond top dead center, and auxiliary piston and cylinder means for directing air into and compressing the same in the first mentioned cylinder as the piston therein is moving beyond top dead center to supercharge the same prior to the initiation of combustion.

9. In an internal combustion engine, a cylinder, a piston reciprocable in said cylinder, a crank case, a crank shaft rotatable in said crank case and connected through a pitman with said piston, said cylinder having exhaust porting therein uncovered by the piston near the lower end of its stroke and inlet porting similarly uncovered by said piston, a duct connecting the crank case with said inlet porting, means for admitting air into said crank case as the piston moves upwardly toward top dead center to be partially compressed therein as said piston moves downwardly toward bottom dead center and discharged upwardly through said duct as the piston uncovers said inlet porting, means for introducing fuel into the duct to form a fuel mixture with the air being discharged upwardly through said duct an igniter adapted to initiate combustion in the cylinder after the piston has travelled a considerable distance beyond top dead center, an auxiliary cylinder, an auxiliary piston reciprocable in said auxiliary cylinder, a by-pass duct communicating between said cylinders, and a back check valve in said by-pass duct permitting flow of air into the first mentioned cylinder from the auxiliary cylinder but preventing the discharge of products of combustion into said by-pass duct.

10. Engine structure as defined in claim 9 in which there is included cam means on the crank shaft effective to control the reciprocation of the auxiliary piston in timed relation to the main cylinder piston, and wherein the auxiliary piston has a back check valve therein for permitting air from the crank case to pass therethrough on the in stroke of the auxiliary piston to be compressed and forced through the by-pass duct thereby on the out stroke.

BEVERLY T. WAGERS.

REFERENCES CITED

The following references are of record in the file of this patent:

UNITED STATES PATENTS

| Number | Name | Date |
|---|---|---|
| 1,054,080 | Bachman | Feb. 25, 1913 |
| 1,079,578 | Peterson | Nov. 25, 1913 |
| 1,119,432 | Kerscht | Dec. 1, 1914 |
| 1,305,894 | Gernandt | June 3, 1919 |
| 1,313,578 | Burchett | Aug. 19, 1919 |
| 1,821,662 | Muller | Sept. 1, 1941 |
| 2,383,565 | Rose | Aug. 28, 1945 |

FOREIGN PATENTS

| Number | Country | Date |
|---|---|---|
| 455,432 | Great Britain | of 1936 |